(12) United States Patent
Ferlitsch

(10) Patent No.: US 7,464,085 B2
(45) Date of Patent: Dec. 9, 2008

(54) OUTPUT PROCESSING WITH DYNAMIC REGISTRATION OF EXTERNAL TRANSLATORS

(75) Inventor: Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 205 days.

(21) Appl. No.: 11/535,226

(22) Filed: Sep. 26, 2006

(65) Prior Publication Data

US 2008/0077625 A1  Mar. 27, 2008

(51) Int. Cl.
G06F 7/00 (2006.01)

(52) U.S. Cl. .............................. 707/4; 707/2
(58) Field of Classification Search ............... 707/100, 707/104.1, 24, 102
See application file for complete search history.

(56) References Cited

U.S. PATENT DOCUMENTS

| 5,255,054 A | 10/1993 | Tsai | |
|---|---|---|---|
| 2002/0138250 A1* | 9/2002 | Okura et al. | 704/2 |
| 2002/0138564 A1 | 9/2002 | Treptow et al. | |
| 2002/0186393 A1 | 12/2002 | Pochuev et al. | |
| 2003/0011814 A1 | 1/2003 | Nunokawa et al. | |
| 2003/0095284 A1 | 5/2003 | Parry | |
| 2003/0137693 A1 | 7/2003 | Nishio | |
| 2003/0176995 A1* | 9/2003 | Sukehiro | 704/2 |
| 2004/0130744 A1 | 7/2004 | Wu et al. | |
| 2004/0184073 A1 | 9/2004 | Shahindoust | |
| 2004/0187076 A1* | 9/2004 | Ki et al. | 715/513 |
| 2005/0168772 A1 | 8/2005 | Kim | |
| 2005/0234702 A1* | 10/2005 | Komiya | 704/2 |
| 2005/0273852 A1 | 12/2005 | Ferlitsch | |
| 2006/0011720 A1* | 1/2006 | Call | 235/383 |
| 2006/0039012 A1 | 2/2006 | Ferlitsch | |
| 2007/0061266 A1* | 3/2007 | Moore et al. | 705/51 |
| 2007/0061487 A1* | 3/2007 | Moore et al. | 709/246 |

FOREIGN PATENT DOCUMENTS

| EP | 1338952 A2 | 8/2003 |
|---|---|---|
| JP | 2000118085 A | 4/2000 |
| JP | 2005014237 A | 1/2005 |

* cited by examiner

*Primary Examiner*—Don Wong
*Assistant Examiner*—Linh Black
(74) *Attorney, Agent, or Firm*—Larry K. Roberts

(57) ABSTRACT

Output processing includes inputting an electronic file of a document to an outputting device capable of output processing operations. A database of external translators is maintained by the device for conversion of file formats from non-native file formats. If the format of the file is a native format, it is output processed by the outputting device. If the format is a non-native format, an external registered translator is selected and the file sent to the selected external registered translator for format conversion to a native format. The format-converted file is received at the output processing device, and output processed.

19 Claims, 5 Drawing Sheets

OUTPUT PROCESSING WITH DYNAMIC REGISTRATION OF EXTERNAL TRANSLATORS

BACKGROUND

Printing devices, such as multifunction peripheral (MFP) devices capable of multiple functions such as copying and printing, can receive electronic print jobs or files from a connected host device such a PC, or over a network such as a local area network (LAN) or wide area network (WAN). The devices typically have loaded into a memory the format translation service necessary to print the file for the particular document format. For such print jobs, the file format is considered to be a native format. It would be advantageous to provide a capability to print jobs in a non-native format, such as in a case in which printing is to be performed without a connected host.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
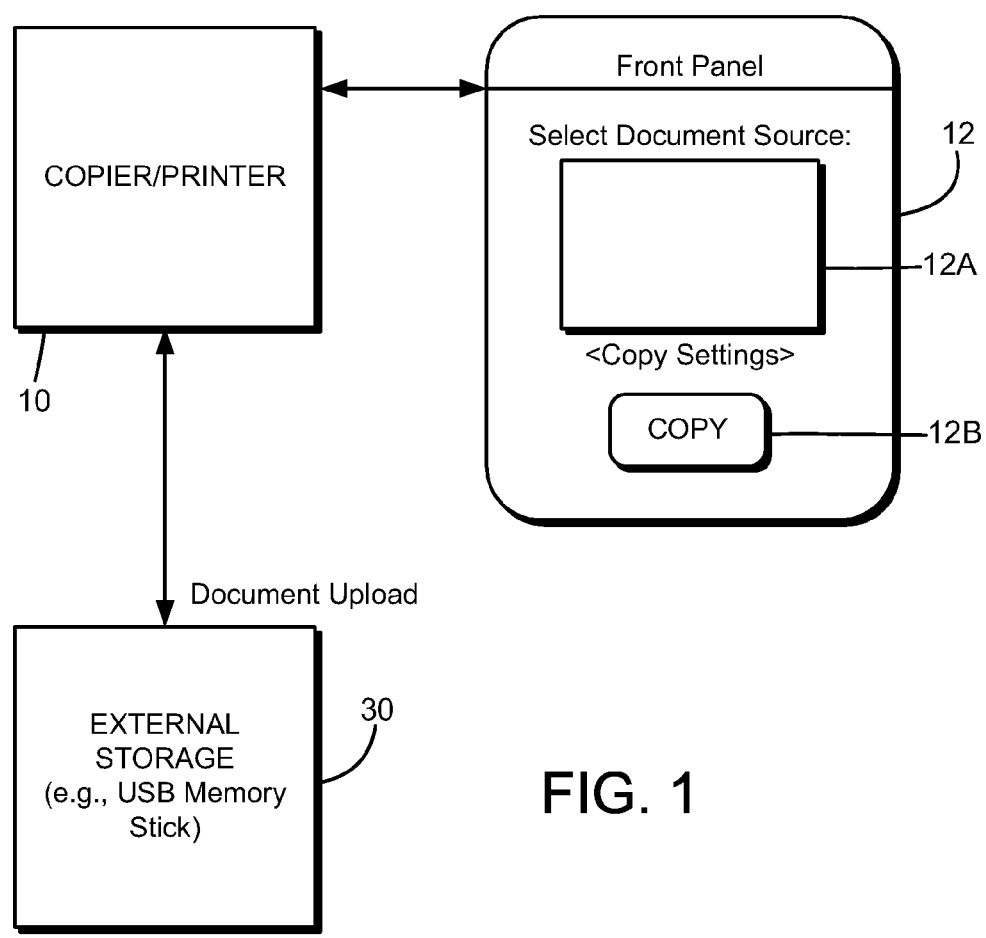
FIG. 1 is a schematic block diagram illustrating an exemplary operating environment.

In the following detailed description and in the several figures of the drawing, like elements are identified with like reference numerals. The figures are not to scale, and relative feature sizes may be exaggerated for illustrative purposes.

An exemplary embodiment of a technique is described for a device such as an MFP to select an external translator for a hostless print operation, e.g. a walk-up USB print function, an email print function, a pull print function, an FTP print function, a print from a digital camera, etc, when the file to print is of a format which is not native to the printing device. An exemplary pull print may be a function in which a user is at a front panel of an MFP device, and is able to browse a remote location for files. Once selected, the MFP then pulls the file from the remote location for printing or other output processing. An exemplary operating environment includes one or more printing devices such as MFPs, which are locally, network or remotely connected, and are capable of hostless printing operation, such as a direct print from a USB port. Typically a user may operate the front panel of the printing device to select both files in softcopy format from an external storage, and copy settings for reproducing the softcopy documents into an output, e.g. hardcopy.

FIG. 1 is a schematic block diagram illustrating an exemplary operating environment. Here an output processing device such as a copier/printer device 10, which may be an MFP, has a front panel 12, which provides a user with control options to use the machine. One exemplary option may be to select a document source to be printed using the machine, e.g. using a touch screen display 12A, and to select the copy settings. A copy button 12B may be used to start the output processing, e.g. a copy/print process. The document source may be from an external storage 30, which in one exemplary embodiment may be a portable electronic storage device such as a USB memory stick or a digital camera which is connected to the device 10 through a USB port. The output processing may be a walk-up operation to the output processing device by a user having personal possession of the portable electronic storage device. Typically in an exemplary embodiment, the user operates the front panel of the device 10 to select both files in softcopy format from an external storage, and copy settings for reproducing the softcopy documents into an output, e.g. hardcopy. The output processing options may also be specified externally, such as in the subject line of an email message or the interface of the portable device, e.g. a digital camera.

Figure 2:
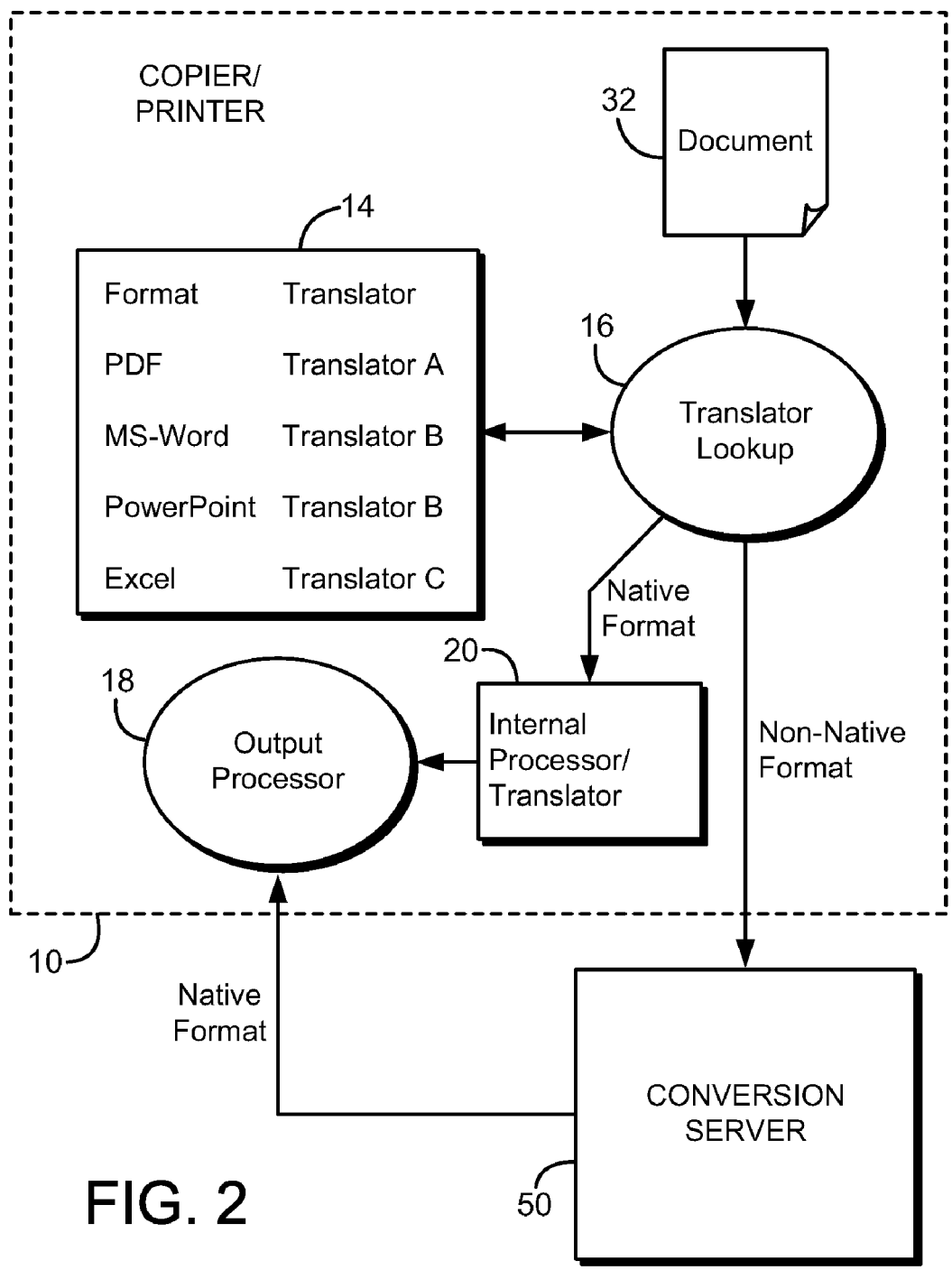
FIG. 2 is a schematic block diagram illustrating an exemplary embodiment of a device 10 that is adapted to use an external translator.

An exemplary operating environment may include a network and one or more locally or remotely connected devices 10 such as MFP devices. The device 10 has outputting capabilities. Examples of such outputting capabilities include a printer, copier, filing device, facsimile device, publishing device, A/V (audio/visual) recorder, and conversion device such as a device which converts a softcopy format into another softcopy format, a language translator (e.g., English-French), or a media conversion (Audio/Video to Audio only). Other conversions may include converting encodings, such as file compression or encryption. In an exemplary embodiment, the device 10 may use the aid of an external device for converting the format of the softcopy document into a format compatible with the device 10. FIG. 2 is a schematic block diagram illustrating an exemplary embodiment of a device 10 that is adapted to use an external translator. The device 10 may maintain a database 14 of registered translators, e.g. in an electronic storage or memory device in the device 10, where each translator is registered for conversion of one or more file formats into the device's native format. For the exemplary embodiment, the database 14 associates external translator A with a pdf format, translator B with a Microsoft Word format, translator C with a Microsoft PowerPoint format, and translator C with a Microsoft Excel format.

In an exemplary embodiment, the MFP device 10 may be operated to perform a walkup copy job, where the user operates the processing/outputting of a document via the front panel 12 (FIG. 1) of the device. The exemplary MFP device may take input from either a hardcopy source (e.g., scanner) or softcopy (e.g., filled data) source, or both. Additionally, when the input is a softcopy source, the input source may be either internal to the device, or an external source 30 (FIG. 1). Examples of external input sources include USB memory sticks, floppy discs, CDs/DVDs, mobile devices (PDAs, Laptops), document servers, email attachments, FTP sites, and internet sites.

The exemplary operating environment may also include one or more application/conversion servers 50 which can perform format conversion services. The conversion servers may have the translators loaded, when the translators are implemented as software. If a translator is implemented as a hardware conversion, then the server may be the converter. The MFP device and application/conversion servers are communicatively coupled, such as by TCP/IP, Apple Talk, IEEE 1284 Parallel Port, IrDA, Bluetooth, WiFi, other wireless protocols, and local ports (e.g., serial, USB).

The user may select any form of output processing supported by the device 10, such as hardcopy output, facsimile transmission, and filing storage. The output processing is generally illustrated in FIG. 2 as output processor 18. The user may specify settings for the output processing, such as (i) none—use the device's default settings; (ii) set settings from the device's operations panel; or (iii) set settings from a device's remote front panel interface (e.g., embedded web page).

The user may also input the softcopy source document 32 (FIG. 2) into the device 10 by any means, such as from a USB port, floppy disc, CD/DVD, and URL to the location, or from a mobile device by an infrared link (e.g. irDA), or other wireless link (WiFi, etc.). Once the user has selected the output settings and the softcopy source, the MFP device 10 may then pull an initial sample or the entire softcopy source file, sufficient enough to determine the file format of the data. The format may be determined by any means, such as by a unique identifier sequence in the file data header (e.g., % PDF for PDF), by the file suffix (e.g., .doc, .PDF, etc.), or entered by the operator.

Once the MFP device has determined the file format of the softcopy source, the MFP determines if the file format is natively supported by the MFP (i.e., has internal translator/processor for the format). For example, the MFP 10 may include a processor 16 (FIG. 2) for controlling the MFP and implementing a translator lookup function to perform the function of determining if the file format is natively supported. If so, the softcopy source is processed internally within the MFP by internal processor/translator 20, and the native format data is processed by the output processor 18. If the file format is recognized as a non-native format, the MFP device 10 looks up the file format in a database 14 of registered external translators, where each translator registers for converting one or more file formats. Exemplary types of translators include transcoders and application/driver converters. Transcoders are direct format-to-format translators. An example is a PDF to TIFF transcoder. Application/Driver Converters are format-to-OS intermediate format-to-format translators. Example: Using MS-Word with a PCL printer driver to convert MS-Word to PCL If there is not an external translator registered to convert the file, the MFP may then reject the outputting job, queue the outputting job pending an external translator registering itself for the file format, communicate over the network (e.g., multicast, broadcast) requesting that an external translator register itself for the file format, or notify the user and await corrective action.

If the MFP device does find a registered external translator, the MFP may then send the file data for conversion to a conversion server 50 on which the registered external translator is located. Once the external translator converts the file, the converted file is sent back to the MFP by the conversion server. The MFP may wait synchronously (i.e., blocking) or asynchronously (e.g., event driven) for the converted file. Communication between the MFP and the external translator may also be secured, such as by using encryption. The file exchanges between the MFP and external translator may also be compressed.

Any protocol may be used to request a conversion from an external translator and for exchanging the non-native and converted files, such as XML data over a proprietary port, Web Service (SOAP/XML), HTML over HTTP, Network File System (NFS), Remote Procedural Call (RPC), File Transfer Protocol (FTP), email message, etc.

Figure 3:
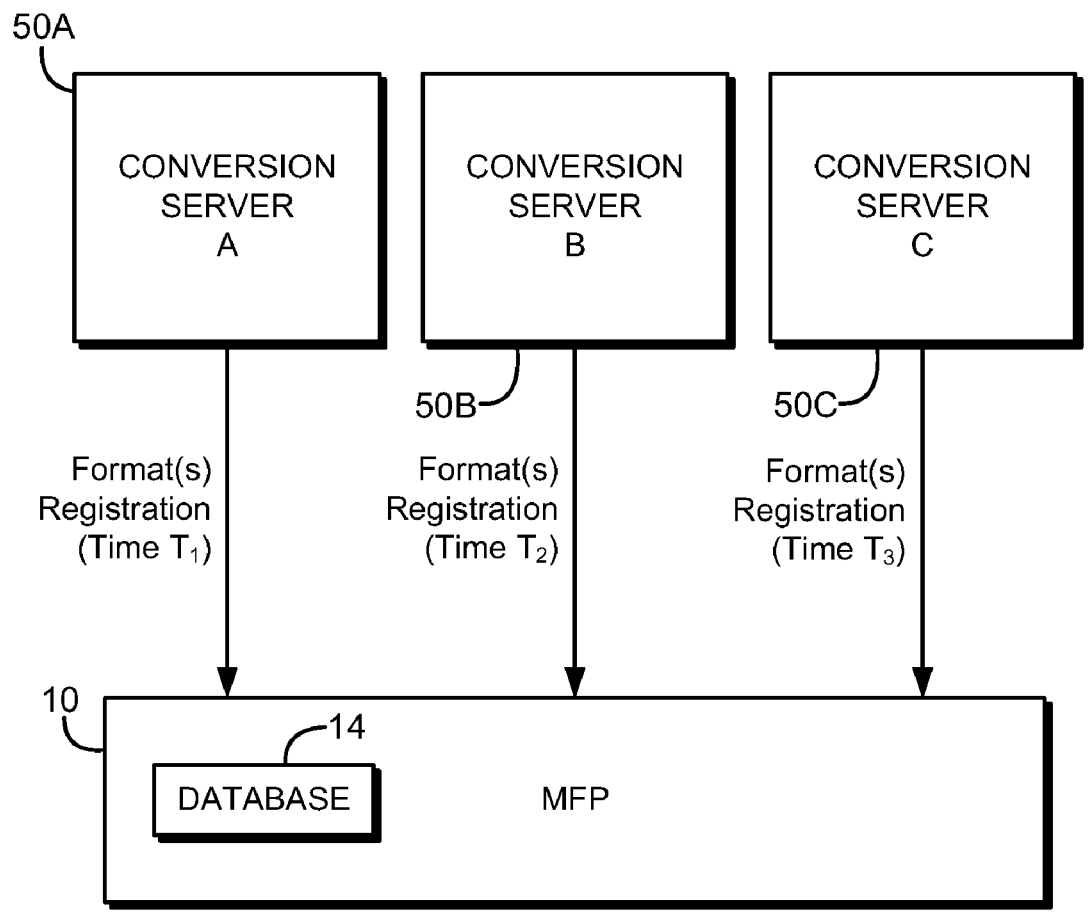
FIG. 3 is a schematic illustration of an exemplary embodiment of an operating environment including an MPF and a plurality of conversion servers.

In an exemplary embodiment, the database 14 of registered translators may be updated in real time by the external translators. FIG. 3 is a schematic illustration of an operating environment including an MPF 10 and a plurality of conversion servers 50A, 50B, 50C. For example, an external translator may dynamically register and unregister itself with the device 10 for conversion of one or more file formats. The external translators 50A, 50B, 50C may register and/or unregister themselves as application/conversion services to achieve an efficient use of the device 10, such as automatic replacement of an external translator when it goes offline, distribution of the workload when a translator becomes too active, enablement of different translators on different servers for licensing reasons or in the case in which an external translator can perform the function more efficiently than another.

When the external translator registers itself with the MFP, it indicates which file formats it can convert to a format that is supported by the device. For example, in the embodiment of FIG. 3, the conversion server 50A registers at time T1 for a given format or formats, the conversion server 50B registers at time T2 for a format or formats, and the conversion server 50C registers at time T3 for its format or formats. Each external translator may use any means to determine which output formats the device supports, such as querying the device for its supported formats (e.g., SNMP/MIB), or looking up the printer's supported format in a database using the model/type of printer as an index (e.g., Sharp Printer Model Database). A conversion server includes one or more external translators, and may be a single physical device, a cluster of physical devices, a partition of a single device, or a set of translators distributed across devices.

The external translators may make the decision on when to register or unregister either independently of each other, or cooperatively. The [un] registration may be dynamic, i.e. in real time. Examples of why an external translator may register or unregister itself include a new conversion format is added or removed (e.g., addition/deletion of an application/converter or transcoder) to the external translator; the workload on the external translator is temporarily too high, so the external translator places itself offline until the workload is reduced; the workload on the external translator is temporarily idle or below a threshold, so the external translator places itself online; or a temporary lack of, or return of, shared licenses of the application/conversion program accessible to the external translator.

The external translator may then register, or unregister itself, for one or more file format conversions by downloading a command program to the device, such as by HTTP; SOAP/XML message; Printer Job Language (PJL) command sequence via LPR (Line Printer Protocol), IPP (Internet Printing Protocol), or RAW (raw transmission with no protocol) 9100; SNMP/proprietary MIB (Management Information Block) settings; email message.

For example, if the registration method is implemented using the Printer Job Language (PJL) command set, the command program might include the following, where <UEL> stands for the Universal Exit Language sequence (<Esc> % -12345X):

<UEL>
@ PJL RESET
@ PJL DEFAULT TIFF:TRANSLATOR="172.29.225.134:5809:raw"
@ PJL DEFAULT WORD:TRANSLATOR="172.29.225.134:5809:raw"
<UEL>

In the above example, the command set would do the following:

Set the language format specific (e.g., TIFF, WORD) environment variable for TRANSLATOR;

Identify (in the first part of the command) the IP address of the device where the external translator is located;

Identify (in the second part of the command) the port number to connect to, to obtain the translator service;

Identify (in the third part of the command) the protocol for communicating with the external translator.

In the above exemplary implementation, each format would have only one active translator assigned. For example, if a second external translator sent a registration message for the same file format(s) after the first external translator, the registration by the first external translator would be replaced by the registration of the second.

In other implementations, the device may maintain multiple registrations for the same file format. In this case, when the MFP device looks up an external translator for a file format and gets multiple external translators, the MFP device may use any means to select one.

Figure 4:
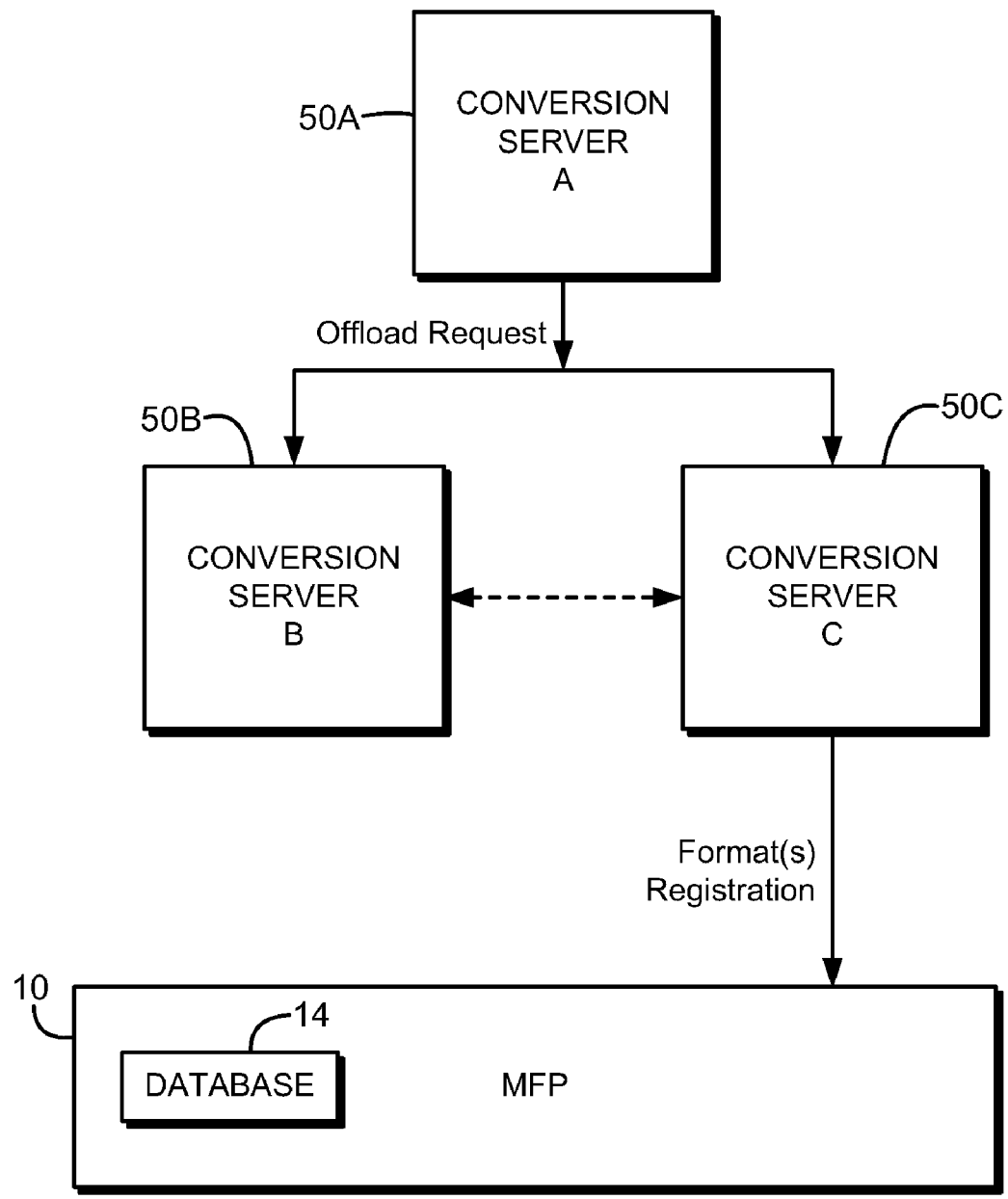
FIG. 4 is a schematic block diagram illustrating an exemplary embodiment of an operating environment including a group of printing devices and a group of conversion servers that are adapted to act cooperatively with each other by exchanging messages or monitoring each other.

In another embodiment depicted in the schematic block diagram of FIG. 4, the external translators may act cooperatively with each other by exchanging messages or monitoring each other. For this particular example, only server 50C is registered with the database 14 of the device 10 for the time frame illustrated. The external translators may do this to achieve any desirable outcome, such as distributing the workload when there is a high activity on some, but not other external translators; distributing the workload due to shared license availability; take over for an external translator if the external translator becomes otherwise unavailable (e.g., disconnected, offline, etc.). For example, as depicted in FIG. 4, there are three conversion servers 50A, 50B, 50C. Conversion server 50A may send an offline request to servers 50B, 50C, informing them that it (50A) is offline. Conversion servers 50B, 50C communicate with each other, and determine that server 50C should register itself with the MFP device 10 for a particular format.

Figure 5:
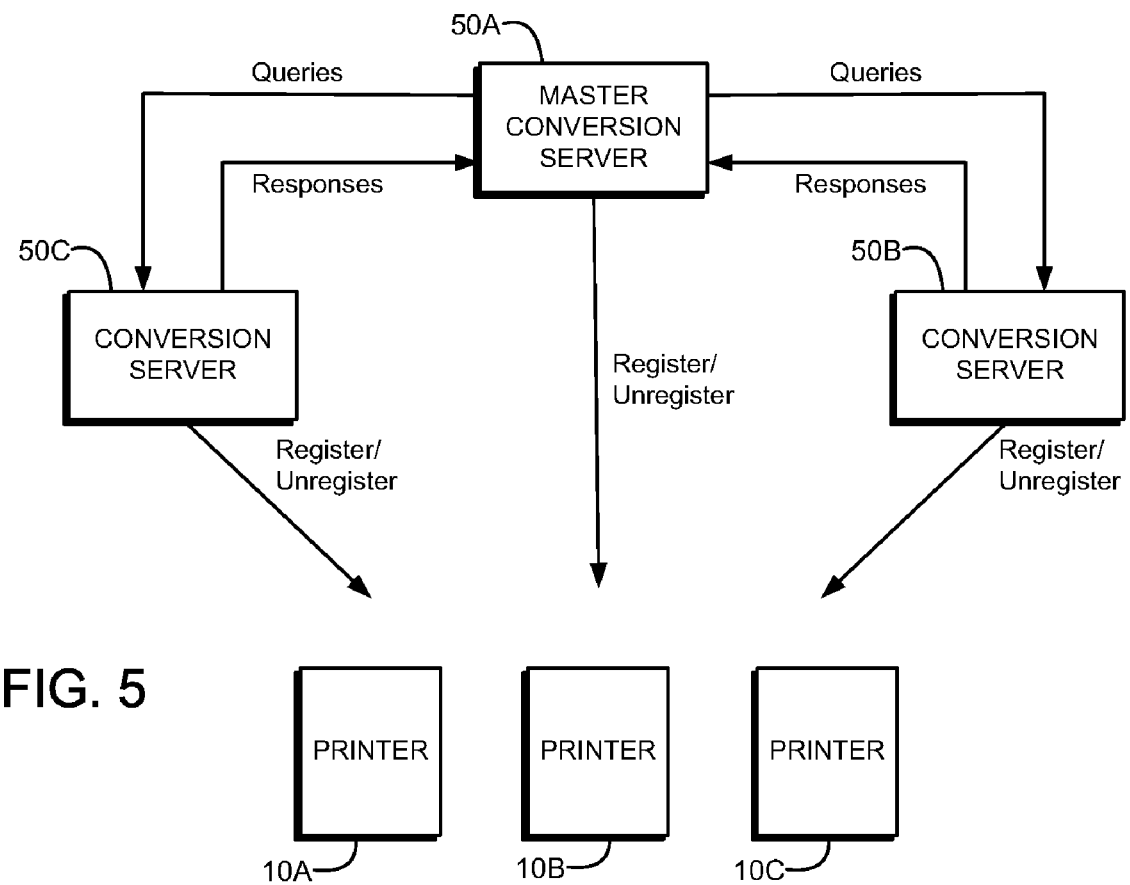
FIG. 5 is a schematic illustration of an operating environment in which several conversion servers are interconnected with each other and to several MFP devices.

In a further exemplary embodiment, an MFP or group of MFP devices may be served by a group of conversion servers one of which acts as a master server to control registration/de-registration of the servers with respect to the non-native format database(s) of the MFP or group of MFPS. FIG. 5 is a schematic illustration of an operating environment in which several conversion servers are interconnected with each other and to several MFP devices. In this exemplary embodiment, several printing devices 10A, 10B, 10C . . . , such as MFPs, are connected on a network, to the network, or by other means, to provide access to conversion servers 50A, 50B, 50C. Each device 10A, 10B, 10C may have the capability to output process files in non-native formats by translators registered on a given device for particular non-native document formats. One conversion server 50A may act as a master server, sending queries to the other conversion servers 50B, 50C to determine their status and translation format properties. Depending on the responses from the queries and one its own status and format properties, the master conversion server 50A may instruct the other servers to register/unregister from the printer devices 10A, 10B, 10C, and to register/unregister itself.

While the foregoing embodiments have been described as performing output processing such as a copy job, other embodiments include other walkup or hostless imaging operations which can take a softcopy input and render an output in either soft or hardcopy format, such as print, fax, publish, format conversion, or scan. In the later case, for example, the MFP may be operated to perform a scan operation to the external storage (e.g., a USB memory stick). In this case, an external translator may be used to convert the scanned output format native to the MFP to a format desired by the user for storage on the external storage device.

Although the foregoing has been a description and illustration of specific embodiments of the subject matter, various modifications and changes thereto can be made by persons skilled in the art without departing from the scope and spirit of the invention as defined by the following claims.

What is claimed is:

1. A method of output processing, comprising:
   inputting from an internal or external source an electronic file of a document to an outputting device capable of output processing operations, wherein the outputting device is a printing device and the output processing operations include a printing operation;
   maintaining a database of external translators for conversion of file formats from non-native file formats not recognized by the outputting device to one or more native formats recognized by the outputting device, wherein the database is updatable dynamically by one or more of said external translators;
   dynamically registering or unregistering one or more of the external translators to or from the database;
   determining whether the format of the document is a native or non-native format;
   if the format is a native format, output processing the document by the outputting device;
   if the format is a non-native format, selecting an external registered translator from the database of external registered translators, sending the electronic file to the selected external registered translator for format conversion to a native format, receiving the format-converted file at the output processing device, and output processing the format-converted file by the output processing device.

2. The method of claim 1, wherein said inputting said electronic file to the output processing device comprises loading the file from a portable electronic storage device to the output processing device.

3. The method of claim 2, wherein said loading the file comprises:
   connecting the portable electronic storage device to a USB port of the output processing device.

4. The method of claim 3, wherein the output processing is a walk-up operation to the output processing device by a user having personal possession of the portable electronic storage device.

5. The method of claim 1, wherein the output processing device is a multifunction peripheral (MFP) system.

6. The method of claim 1, further comprising:
   selecting a file to be processed from an external storage and output processing settings by operation of a front panel of the outputting device.

7. The method of claim 1, wherein said output processing comprises one or more of printing, scanning, faxing, filing, copying, publishing, conversion and audio/visual recording.

8. The method of claim 1, further comprising
   taking one or more of the following actions if there is not an external translator registered for the non-native format:
   rejecting the outputting processing operation;
   queuing the output processing operation pending an external translator registering itself for the file format;
   communicating over the network to request that an external translator register itself for the file format; and
   notifying the user and awaiting corrective action.

9. The method of claim 1, wherein said dynamically registering or unregistering is conducted under master control of an external conversion server.

10. The method of claim 1, wherein said dynamically registering or unregistering is conducted by each external translator independently of each other.

11. The method of claim 1, further comprising:
interconnecting said output processing device and said external translators by a network.

12. A method of hostless output processing, comprising a sequence of the following steps:
inputting from a non-host external source an electronic file of a document to an outputting device capable of hostless output processing operations, wherein the outputting device is a printing device and the output processing operations include a printing operation;
maintaining a database in an electronic storage unit of the outputting device of external translators for conversion of file formats from non-native file formats not recognized by the outputting device to one or more native formats recognized by the outputting device, wherein the database is updatable dynamically to un-register or register one or more of said external translators;
determining whether the format of the document is a native or non-native format;
if the format is a native format, output processing the document by the outputting device;
dynamically registering or unregistering one or more of the external translators to or from the database;
if the format is a non-native format, selecting an external registered translator from the database of external registered translators, sending the electronic file to the selected external registered translator for format conversion to a native format, receiving the format-converted file at the output processing device, and output processing the format-converted file by the output processing device.

13. The method of claim 12, wherein said inputting said electronic file to the output processing device comprises one of loading the file from a portable electronic storage device to the output processing device, from an email attachment, from a digital camera or from an FTP print job.

14. The method of claim 12, wherein said updating of said database is conducted under master control of an external conversion server communicatively coupled to the outputting device.

15. The method of claim 12, wherein said updating of said database is conducted by each external translator independently of each other.

16. The method of claim 12, further comprising:
interconnecting said output processing device and said external translators by a network;
taking one or more of the following actions if there is not an external translator registered for the non-native format:
rejecting the outputting processing operation;
queuing the output processing operation pending an external translator registering itself for the file format;
communicating over the network to request that an external translator register itself for the file format; and
notifying the user and awaiting corrective action.

17. A system for output processing, comprising:
a network;
one or more application/conversion servers connected to the network, said one or more servers each conversion server including one or more external format translators;
an output processing device connected to the network, the output processing device including a processor for controlling the output processing device and implementing a translator lookup function to determine if the file format of a file to be processed is natively supported, an internal processor/translator for processing electronic files in native format, an output processor responsive to native format data, and a database of said external translators for conversion of file formats from non-native file formats not recognized by the outputting device to one or more native formats recognized by the outputting device, wherein the database is updatable dynamically by one or more of said external translators, and wherein the output processing device is adapted to determine if the format of a file to be processed is a non-native format, to select an external registered translator from the database of external registered translators, to send the electronic file via the network to the selected external registered translator for format conversion to a native format, to receive the format-converted file at the output processing device, and to output process the format-converted file, and wherein the outputting device is a printing device and the output processing operations include a printing operation;
the one or more application/conversion servers configured to dynamically register and unregister one or more of the external translators to or from the database.

18. The system of claim 17, wherein the output processing device is adapted to receive an input file to be output processed from a portable electronic storage device.

19. The system of claim 17, wherein the output processing device is a multifunction peripheral (MFP) device.

* * * * *